Nov. 2, 1965 N. SZEREMY 3,215,775
KEYED AUTOMATIC GAIN CONTROL CIRCUIT
Filed Nov. 27, 1962
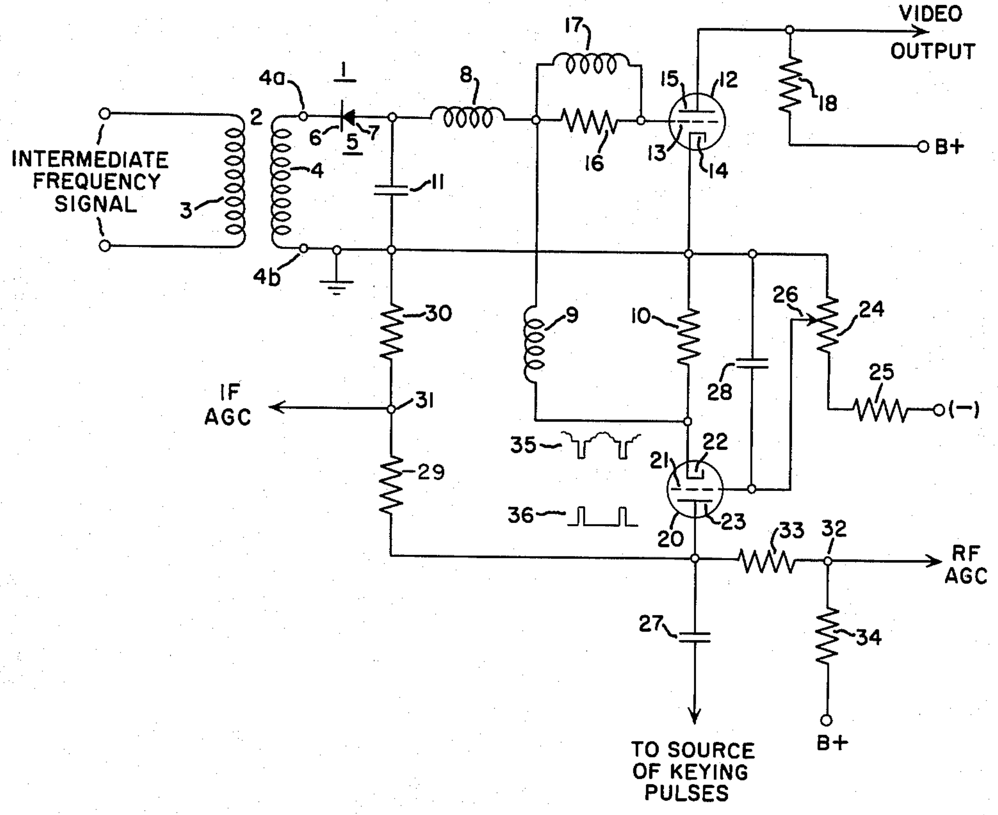
INVENTOR:
NORMAN SZEREMY.
BY Frank J. Thompson
HIS ATTORNEY.

3,215,775

KEYED AUTOMATIC GAIN CONTROL CIRCUIT

Norman Szeremy, Syracuse, N.Y., assignor to General Electric Company, a corporation of New York Filed Nov. 27, 1962, Ser. No. 240,235
3 Claims. (Cl. 178—7.3)

This invention relates to a gain control circuit for use in a television receiver to control the gain of the receiver automatically in accordance with the intensity of the received signal and, in particular, to an automatic gain control circuit of the keyed type.

In accordance with the present television broadcasting standard in the United States, the transmitted composite television signal includes blanking pulses and synchronizing pulses which are interspersed with the negative amplitude modulated picture information on the video carrier wave. The synchronizing pulses are transmitted only during blanking periods, i.e., periods when the picture scanning beam is interrupted or blacked out between line scanning traces, and are superimposed on the blanking pulses. Blackness of a transmitted scene corresponds to 75% of the maximum envelope amplitude and the blanking pulses are transmitted at this level. The synchronizing pulses, superimposed on the blanking pulses, occupy the range between 75% and 100% of maximum envelope amplitude, and so are transmitted as "blacker than black."

It is desirable in a television receiver to automatically control the gain of the radio frequency and intermediate frequency amplifying stages in order to apply a relatively constant level input signal to the video detector, even though the received signal strength may vary over a wide range. In order to attain the aforementioned constant level input signal to the video detector, it is necessary that the automatic gain control potential be developed so that its magnitude is a function of received signal strength only and is independent of scene brightness. To this end, the automatic gain control potential can be developed by sampling the demodulated composite television signal only during the blanking or synchronizing pulse intervals, since the amplitude of the signal during the line periods is a function of scene brightness. Such a system, in which the gain control circuitry functions only during the period when blanking or synchronizing information is received, is termed a keyed automatic gain control system. The present invention is directed toward an improvement in keyed automatic gain control systems.

It is an object of the invention to provide an improved automatic gain control circuit in a television receiver.

It is another object of the invention to provide a keyed automatic gain control circuit in a television receiver wherein the keyer tube is independent of the video amplifier circuitry.

It is another object of the invention to provide a keyed automatic gain control circuit in a television receiver which employs a minimum number of components in furnishing a properly phased automatic gain control signal.

It is a further object of the invention to provide an improved keyed automatic gain control circuit in a television receiver wherein the capacity introduced by the keyer tube into the video circuit is negligible and wherein signal lockout is eliminated.

Briefly stated, in accordance with the illustrated embodiment of the invention, a keyer tube is connected in a grounded grid configuration with a the cathode of the keyer tube being connected to the common point of the load resistor and the peaking coil in the second detector circuit, so that a negative-going demodulated composite television signal is applied to the cathode. The grid of the keyer tube is biased at a relatively fixed negative potential while the anode is coupled to a source of positive-going keying pulses which are coincident with the synchronizing pulses of the composite video signal. Appropriate networks are connected to the anode of the keyer tube to render an automatic gain control potential available to appropriate amplification stages in the television receiver preceding the second detector.

The subject matter of the invention is particularly pointed out and distinctly claimed in the concluding portion of the specification. The invention, however, both as to organization and method of operation may best be understood by reference to the following description taken in connection with the accompanying drawing, the single figure of which illustrates the keyed automatic gain control circuit of the invention.

In practicing my invention, a superheterodyne television receiver of conventional design is provided including a radio frequency amplifier stage, a first detector or mixer stage, a plurality of intermediate frequency amplifier stages, and a horizontal and vertical scanning system. The aforementioned components are well known in the art and have been omitted from the drawing.

With reference to the drawing, the embodiment of the invention illustrated therein includes a video detector 1 coupled to the last intermediate frequency amplification stage of the television receiver by a transformer 2 having a primary winding 3 and a secondary winding 4. The video detector 1, which serves to derive the composite video signal from the received modulated carrier, comprises a diode 5, having a cathode electrode 6 and an anode electrode 7, an inductor 8, a peaking coil 9, and a load resistor 10, the aforementioned components being serially connected in that order, across secondary winding 4 of transformer 2. Cathode 6 of diode 5 is connected to terminal *4a* of secondary winding 4 while a terminal of load resistor 10 is connected to the terminal *4b* of secondary winding 4, terminal *4b* being connected to ground. A capacitor 11 is connected between anode 7 of diode 5 and terminal *4b* of secondary winding 4. The negative-going demodulated composite video signal derived by detector 1 is developed across the serial combination of peaking coil 9 and load resistor 10.

In order to provide the required high level video signal to the picture tube of the television receiver, the output of video detector 1 is applied to a video amplifier tube 12 for amplification of the demodulated composite video signal. Tube 12 may be a pentode, or a triode, as shown, having a control grid electrode 13, a cathode electrode 14, and an anode electrode 15. Control grid 13 of tube 12 is connected to the common point of inductor 8 and peaking coil 9 through a series peaking network comprising a resistor 16 shunted by an inductor 17. Cathode 14 is connected directly to ground while anode 15 is connected to an appropriate source of positive potential through a load resistor 18. The demodulated composite video signal appearing across peaking coil 9 and load resistor 10 of video detector 1 is thus applied between control grid 13 and cathode 14 of video amplifier tube 12, the amplified video signal available at anode 15 being utilized in a conventional manner in the television receiver.

The keyed automatic gain control circuit of the invention comprises a keyer tube 20 connected in a grounded grid configuration. The grounded grid arrangement produces properly phased automatic gain control signals and permits circuit simplification. Although the keyer tube is shown to be a triode in the drawing, any appropriate active circuit element having appropriate characteristics may be used. Keyer tube 20 comprises a control grid electrode 21, a cathode electrode 22, and an anode electrode 23. Cathode 22, which is the input electrode of keyer tube 20, is connected to the common point of peaking coil 9 and resistor 10. Peaking coil 9 is thus interposed between the input electrode of keyer tube 20 and the control grid of video amplifier tube 12, thereby serving to render keyer tube 20 independent of video amplifier tube 12 and reducing interaction between the keyer and amplifier circuits. In addition, the separation of the video amplifier grid circuit from the keyer tube by peaking coil 9 prevents introduction of the keyer tube capacitance into the video amplifier circuit, thereby preserving the high frequency response of the video amplifier. Resistor 10 serves the double function of load resistor for the video detector 1 and input coupler for the keyer tube 20.

Control grid 21 of keyer tube 20 is negatively biased from a voltage divider comprising resistors 24 and 25, a terminal of resistor 25 being connected to a convenient negative voltage point in the receiver, e.g., the horizontal output tube grid. Wiper 26, associated with resistor 24, enables adjustment of the negative bias of control grid 21, to thereby control the operating point of keyer tube 20.

Anode 23 of keyer tube 20 is coupled through capacitor 27 to a source of positive-going keying pulses which are synchronized and coincident with the synchronizing pulse of the demodulated composite video signal applied to cathode 22. The keying pulses, which serve to render keyer tube 20 conductive during the synchronizing pulse periods, may be, for example, horizontal flyback pulses derived from the horizontal scanning system of the receiver. A by-pass capacitor 28 is connected from the control grid 21 of keyer tube 20 to ground to reduce the horizontal pulse voltage that might otherwise exist at the grid as a result of capacitive coupling between anode and grid and to prevent control grid bias changes due to strong noise impulses in the receiver.

In order to derive an automatic gain control potential during the keying periods, anode 23 of keyer tube 20 is connected to ground through serially connected resistors 29, and 30, which serve as a load for the keyer tube. The potential appearing at circuit point 31, the common point of resistors 29 and 30, is proportional to received signal strength and independent of picture modulation or scene brightness, therefore constituting a suitable automatic gain control signal for application to appropriate amplification stages preceding the video detector in the television receiver, for example, the intermediate frequency amplification stages. The ratio of the combined value of resistors 29 and 30 to that of resistor 10 should be large enough to insure that the voltage drop across resistor 10, due to the current flow through keyer tube 20, is small compared to the voltage drop due to the synchronizing pulse portion of the demodulated composite video signal, to thereby preclude false synchronization of the receiver.

Keyer tube 20 may also be employed to derive, at circuit point 32, a second automatic gain control potential which is delayed, as a function of received strength, with respect to the automatic gain control potential available at circuit point 31. This second automatic gain control potential may be applied, for example, to the radio frequency amplifier stage of the television receiver. Resistor 33, connected between anode 23 and circuit point 32, and resistor 34, connected between circuit point 32 and an appropriate source of positive potential, serve to establish the appropriate delay in order to prevent premature gain reduction on reception of weak signals and to preserve optimum signal-to-noise ratio in the radio frequency amplification stage until the received signal has reached a desirable level.

In operation, the negative-going demodulation composite video signal appearing across resistor 10, diagrammatically illustrated at 35, is applied to cathode 22 of keyer tube 20 while the positive-going keying signal, illustrated diagrammatically at 36, is applied to anode 23. Keyer tube 20 is rendered conductive by the simultaneous application of the aforementioned signals and serves to amplify the signal applied to cathode 22. With the bias potential of control grid 21 being fixed upon adjustment of wiper 26, the magnitude of the potential at cathode 22 controls the D.C. potential at anode 23 during the keying period. Because of the grounded grid configuration, the D.C. automatic gain control signals available at circuit points 31 and 32 are in phase with the potential variations at cathode 22 during the keying periods, and are therefore suitable for direct application to appropriate amplification stages in the receiver. To illustrate, as the received signal strength increases, the potential at cathode 22, during the keying periods, becomes more negative. With the potential of control grid 21 being fixed, the plate current of the keyer tube 20 increases accordingly, thereby rendering the automatic gain control voltage available at circuit points 31 and 32 more negative to effect a reduction in gain of the amplifiers. The reduction in gain of the radio frequency or intermediate frequency amplifiers maintains the input signal to the video detector at a constant level despite the variations in received signal strength.

The keyed automatic gain control system of the invention thus employs a simplified circuit utilizing a minimum number of components to furnish properly phased automatic gain control signals in the television receiver. The keyer tube is independent of the video amplifier and introduces negligible capacitance into the video amplifier circuit, as described. In addition, signal lockout in the receiver due to momentary overdriving of the video amplifier is avoided by the keyed automatic gain control circuit of the invention since synchronizing pulses are available to the keyer tube even if the video amplifier is overloaded.

Although the invention and its operation has been described with reference to a specific embodiment, the invention is not to be limited to this embodiment. Many modifications will be obvious to those skilled in the art. It is thus intended in the appended claims to claim all such variations as fall within the true scope of the invention.

What is claimed as new and desired to be secured by Letters Patent of the United States is:

1. In a television receiver adapted to receive a composite television signal including recurrent blanking and synchronizing pulses, and including a video detector having a load impedance, a keyed automatic gain control circuit comprising:

(a) a keyer tube having a control grid, a cathode, and an anode, (b) means connecting said cathode to said load impedance for applying a demodulated composite television signal to said cathode, (c) bias means for applying a relatively fixed negative potential to said control grid, (d) means for applying keying pulses coincident with the recurrent synchronizing pulses of the demodulated composite television signal to said anode to render said keyer tube conductive during the synchronizing pulse periods, and (e) means connected to said anode for deriving an automatic gain control potential for application to appropriate amplification stages in the receiver.

2. In a television receiver adapted to receive a composite televison signal including recurrent blanking and synchronizing pulses, and including a video detector having a load resistor serially connected with a peaking coil, a keyed automatic gain control circuit comprising:

(a) a keyer tube having a control grid, a cathode, and an anode, (b) means connecting said cathode to the common point of said load resistor and said peaking coil whereby a demodulated composite television signal is applied to said cathode, (c) bias means for applying a relatively fixed negative potential to said control grid, (d) means for applying keying pulses coincident with the recurrent synchronizing pulses of the demodulated composite television signal to said anode to render said keyer tube conductive during the synchronizing pulse periods, and (e) means connected to said anode for deriving an automatic gain control potential for application to appropriate amplification stages in the receiver.

3. In a television receiver adapted to receive a composite television signal including recurrent blanking and synchronizing pulses and including a video detector and a video amplifier, in combination:

(a) a peaking coil having a first and a second terminal and a load resistor serially connected in said video detector circuit, said first terminal of said peaking coil being connected to said load resistor, (b) means connecting said second terminal of said peaking coil to said video amplifier, (c) a keyed automatic gain control circuit comprising:

(1) a keyer tube having a control grid, a cathode, and an anode, (2) means connecting said cathode to said first terminal of said peaking coil whereby a demodulated composite television signal is applied to said cathode, (3) bias means for applying a relatively fixed negative potential to said control grid, (4) means for applying keying pulses coincident with the recurrent synchronizing pulses of the demodulated composite television signal to said anode to render said keyer tube conductive during the synchronizing pulse periods, and (5) means connected to said anode for deriving an automatic gain control potential for application to appropriate amplification stages in the receiver.

References Cited by the Examiner

UNITED STATES PATENTS

| | | | |
|---|---|---|---|
| 2,797,259 | 6/57 | Thomas | 178—7.3 |
| 2,835,795 | 5/58 | Kroger | 178—7.5 |
| 3,115,547 | 12/63 | Tschannen | 178—7.3 |

DAVID G. REDINBAUGH, *Primary Examiner.*